United States Patent
Factor et al.

(10) Patent No.: US 8,447,781 B2
(45) Date of Patent: May 21, 2013

(54) CONTENT-BASED FILE SYSTEM SECURITY

(75) Inventors: Michael Factor, Haifa (IL); Benjamin Mandler, Zichron Ya'akov (IL); Naama Kraus, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1500 days.

(21) Appl. No.: 11/192,480

(22) Filed: Jul. 29, 2005

(65) Prior Publication Data

US 2007/0027873 A1 Feb. 1, 2007

(51) Int. Cl.
*G06F 7/00* (2006.01)
*G06F 17/30* (2006.01)

(52) U.S. Cl.
USPC .............................. 707/783; 707/784; 707/785

(58) Field of Classification Search
USPC .......................................... 707/783, 784, 785
See application file for complete search history.

(56) References Cited

U.S. PATENT DOCUMENTS

| | | | |
|---|---|---|---|
| 5,388,257 A * | 2/1995 | Bauer | 707/1 |
| 5,519,865 A | 5/1996 | Kondo et al. | |
| 5,832,470 A | 11/1998 | Morita et al. | |
| 5,873,085 A * | 2/1999 | Enoki et al. | 707/10 |
| 6,009,439 A | 12/1999 | Shiomi et al. | |
| 6,014,662 A | 1/2000 | Moran et al. | |
| 6,208,991 B1 | 3/2001 | French et al. | |
| 6,519,571 B1 | 2/2003 | Guheen et al. | |
| 6,745,206 B2 | 6/2004 | Mandler et al. | |
| 6,766,314 B2 | 7/2004 | Burnett | |
| 7,024,427 B2 * | 4/2006 | Bobbitt et al. | 707/200 |
| 7,194,478 B2 * | 3/2007 | Sharpe et al. | 707/102 |
| 2002/0097278 A1 | 7/2002 | Mandler et al. | |
| 2002/0124006 A1 | 9/2002 | Parnell | |
| 2004/0093328 A1 | 5/2004 | Damle | |
| 2004/0098379 A1 | 5/2004 | Huang | |
| 2004/0103102 A1 | 5/2004 | Nelson | |
| 2004/0128615 A1 | 7/2004 | Carmel et al. | |
| 2005/0131955 A1 * | 6/2005 | Borthakur et al. | 707/200 |
| 2006/0036568 A1 * | 2/2006 | Moore et al. | 707/1 |
| 2007/0022091 A1 * | 1/2007 | Styles et al. | 707/2 |

OTHER PUBLICATIONS

Alexander K. Ames, University of California, Santa Cruz, 2004, http://www.cs.ucsc.edu/~sasha/proj/fafs.pdf.*
Alexander Ames et al., Richer File System Metadata Using Links and Attributes, Proceedings of the 22nd IEEE, 13th NASA Goddard Conference on Mass Storage Systems and Technologies, Apr. 2005, Monterey, California.*
Azagury, Alain et al., "A Novel Navigation Paradigm for XML Repositories", Journal of the American Society for Information Science and Technology, 53(6): 515-525, 2002.
Azagury, Alain et al., "XMLFS: An XML-Aware File System", ACM SIGIR Workshop on XML and Information Retrieval, (2000).
Azagury, Alain et al., "Index Infrastructure for an XML Repository", in the ACM SIGIR 2002 XML and IR workshop notes, Tampere, Finland, Aug. 2002.

(Continued)

*Primary Examiner* — Mariela Reyes
(74) *Attorney, Agent, or Firm* — Dan Swirsky

(57) ABSTRACT

A method for enforcing computer-based file system security, the method comprising generating a content-based file system from files in a physical file system, and enforcing a user access right to any aspect of the content-based file system, where the user access right derives from a user access right to a file in the physical file system.

5 Claims, 4 Drawing Sheets

OTHER PUBLICATIONS

Gifford, David K. et al., "Semantic File Systems", Programming Systems Research Group, MIT Laboratory for Computer Science, Proceedings of the 13th ACM Symposium on Operating Systems Principles, 1991.

Azagury A., Factor E.F., Maarek Y.S, and Mandler B, "A Novel Navigation Paradigm for XML Repositories", Journal of the American society for information science and technology, 53(6): 515-525, 2002.

Azagury A., Factor E.F., and Mandler B(2000). XMLFS: an XML-Aware File System. ACM SIGIR workshop on XML and Information Retrieval.

Azagury A., Factor E.F., Kraus N., Loy I., Mandler B., "Index Infrastructure for an XML Repository", in the ACM SIGIR 2002 XML and IR workshop notes, Tampere, Finland, Aug. 2002.

David K. Gifford, Pierre Jouvelot, Mark A. Sheldon, James W.O'Toole, Jr., "Semantic File Systems", ACM Operating System Review p. 20-21, 1991.

Alexander Ames, Nikhil Bobb, Scott A. Brandt, Adam Iliatt, , "Richer File System Metadata Using Links and Attributes", Proceedings of the 22nd IEEE/13th NASA Goddard Conference on Mass Storage Systems and Technologies p. 102-109, 2005.

\* cited by examiner

CONTENT-BASED FILE SYSTEM SECURITY

FIELD OF THE INVENTION

The present invention relates to computer file system security in general, and more particularly to security for content-based computer file systems.

BACKGROUND OF THE INVENTION

The enormous growth in the amount and types of digital information stored in computer file systems has led to new paradigms for representing information to computer users that go beyond the traditional hierarchical directory structure of physical file systems. One new metaphor used to represent file system information is the "content-based" file system, where a directory structure is built using "virtual directories" that are based on characteristics of the files in the file system, such as file content, structure, and metadata. For example, in a content-based file system, files containing information about employees who received a $50,000 bonus might reside in the virtual directory path "/employees/employee/bonus/50000" that may then be traversed to access the files.

In physical file systems that implement the traditional hierarchical directory structure, access security is often implemented at the file or directory level, where information is maintained regarding a user's right to access a file or directory. Thus, a user who does not have rights to a particular file or directory is typically precluded from accessing the file or directory, receiving information regarding the file or directory, or even from "seeing" the file or directory itself. Unfortunately, in a content-based file system, the very knowledge of the existence of a virtual directory may allow a user to deduce information about the content of files in the file system. Also, the very knowledge of the existence of a file under some virtual directory allows a user to deduce information about the content of that particular file. In both cases, a user may deduce information about the content of files without actually opening and reading the files. For example, the existence of the virtual directory path "/employees/employee/bonus/50000" indicates the existence of one or more files containing information about one or more employees whose bonus was $50,000. In addition, the existence of the file "File1.doc" under the directory "/employees/employee/bonus/5000" indicates that the File1.doc contains information about the fact that some employee's bonus was $50,000. Furthermore, in a content-based file system directories are typically not generated in advance, but rather are generated in response to user requests to traverse the virtual directory tree, thus precluding the use of conventional directory-level access security. It would therefore be advantageous to enforce user rights in a content-based file system that does not require knowing each possible virtual directory in advance and that withholds information from users that they are not authorized to have.

SUMMARY OF THE INVENTION

The present invention discloses a system and method for applying physical file system security rights when constructing a content-based file system, whereby user rights in the content-based file system are enforced by:
  allowing a user to see a file in a virtual directory only if the user has the right to read that file; and
  allowing a user to see a virtual directory only where the virtual directory derives from a file that the user has permission to read.

A separate content-based directory tree is typically created for each user where each user is provided with a unique virtual root access directory for navigating the tree and for which the user preferably has sole access.

In one aspect of the present invention a method is provided for enforcing computer-based file system security, the method including generating a content-based file system from files in a physical file system, and enforcing a user access right to any aspect of the content-based file system, where the user access right derives from a user access right to a file in the physical file system.

In another aspect of the present invention the enforcing step includes providing a user with access to a virtual directory in the content-based file system only if the virtual directory is derived from a file which the user has permission to read.

In another aspect of the present invention the enforcing step includes providing a user with access to a file in the content-based file system only if the user has permission to read the file in the physical file system.

In another aspect of the present invention a method is provided for enforcing computer-based file system security, the method including receiving a request associated with a user to access a directory in a file system, and providing the user with access to the directory only if the directory is associated with a file which the user has permission to read.

In another aspect of the present invention the method further includes generating the directory as a virtual directory in a content-based file system.

In another aspect of the present invention the generating step includes deriving the virtual directory from the file in a physical file system.

In another aspect of the present invention the providing step includes providing the access where the user has permission to read the file in a physical file system.

In another aspect of the present invention the providing step includes providing the access where the directory or a descendant subdirectory thereof is derived from the file.

In another aspect of the present invention a system is provided for enforcing computer-based file system security, the system including apparatus operative to generate a content-based file system from files in a physical file system, and apparatus operative to enforce a user access right to any aspect of the content-based file system, where the user access right derives from a user access right to a file in the physical file system.

In another aspect of the present invention the enforcement apparatus is operative to provide a user with access to a virtual directory in the content-based file system only if the virtual directory is derived from a file which the user has permission to read.

In another aspect of the present invention the enforcement apparatus is operative to provide a user with access to a file in the content-based file system only if the user has permission to read the file in the physical file system.

In another aspect of the present invention the system further includes apparatus operative to receive a request associated with a user to access a directory in the content-based file system, where the enforcement apparatus is operative to provide the user with access to the directory only if the directory is associated with a file which the user has permission to read.

In another aspect of the present invention the generation apparatus is operative to generate the directory as a virtual directory in a content-based file system.

In another aspect of the present invention the generation apparatus is operative to derive the virtual directory from the file in a physical file system.

In another aspect of the present invention the enforcement apparatus is operative to provide the access where the user has permission to read the file in a physical file system.

In another aspect of the present invention the enforcement apparatus is operative to provide the access where the directory or a descendant subdirectory thereof is derived from the file.

In another aspect of the present invention a computer-implemented program is provided embodied on a computer-readable medium, the computer program including a first code segment operative to generate a content-based file system from files in a physical file system, and a first code segment operative to enforce a user access right to any aspect of the content-based file system, where the user access right derives from a user access right to a file in the physical file system.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
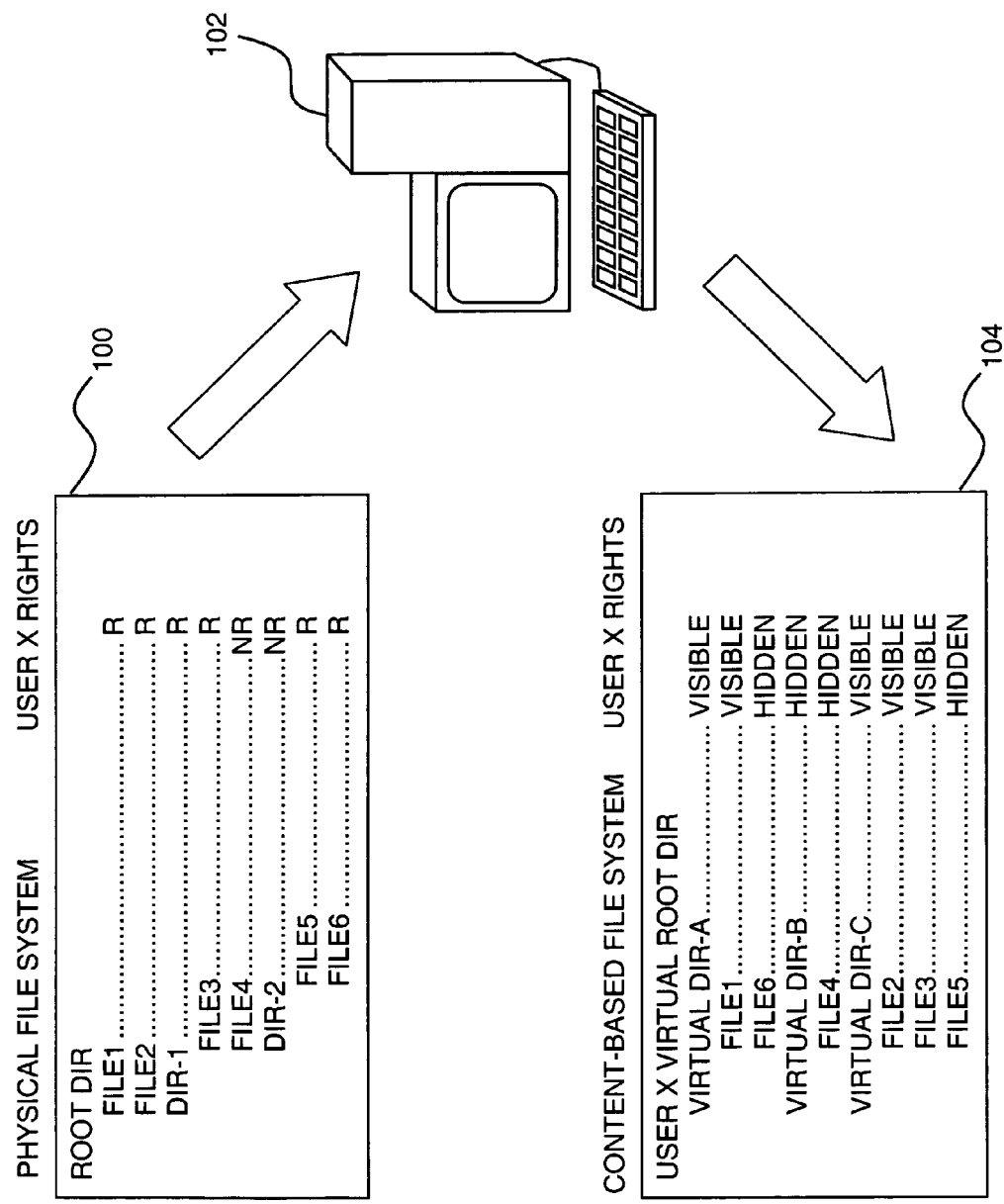
FIG. 1 is a simplified block-diagram illustration of an exemplary system for applying physical file system security rights when constructing a content-based file system, constructed and operative in accordance with a preferred embodiment of the present invention.

Reference is now made to FIG. 1, which is a simplified conceptual illustration of an exemplary system for applying physical file system security rights when constructing a content-based file system, constructed and operative in accordance with a preferred embodiment of the present invention. In the system of FIG. 1 a physical file system 100 resides on or is accessible to a computer 102. Physical file system 100 is shown having one or more files located in the root directory or one or more directories below the root directory. Physical file system 100 is also shown maintaining access control information in accordance with conventional techniques indicating a level of access that a user X has for each file and directory. In the example shown, user X is shown as having "read" rights, designated with an "R", for FILE1, FILE2, FILE3, FILE5, and FILE6, as well as for the directory DIR-1. An "NR" indicated that user X has no read rights with respect to FILE4 and directory DIR-2. In one implementation, although user X has read rights to FILE5 and FILE6, since they reside in DIR-2 for which user X has no read rights, the access control rights of DIR-2 are applied to files and directories below DIR-2, thus preventing user X from reading FILE5 and FILE6.

A content-based file system 104 is constructed by or for computer 102 using content-based file system construction techniques, such as but not limited to the techniques that are described in "Semantic File Systems", by Gifford et al., Programming Systems Research Group, MIT Laboratory for Compute Science, Proceedings of the 13th ACM Symposium on Operating Systems Principles, 1991, where virtual directories are constructed from information associated with files, such as file metadata or information within a file. In accordance with the present invention, the access control rights of physical file system 100 are enforced during the construction of content-based file system 104, whereby a user is provided access to a file in a virtual directory only if the user has the right to read that file, and a user is provided access to a virtual directory only where the virtual directory was constructed using information associated with a file that the user has permission to read. Such access may include receiving a listing of a file or directory name or any other known type of access. A separate content-based directory tree is typically created for each user, where each user is provided with a unique virtual root access directory for navigating the tree and for which the user preferably has sole access.

Thus, in the example shown in FIG. 1, user X is provided with a virtual root directory under which appear virtual directories DIR-A, DIR-B, and DIR-C. DIR-A is shown having been derived from information associated with FILE1 and FILE6. Since user X has read rights to FILE1, DIR-A is visible to user X, as is FILE1, while FILE6 is hidden from user X since user X has no read right to FILE6 in physical file system 100 owing to user X having no read right to DIR-2. DIR-B is shown having been derived from information associated with FILE4. Since user X has no read rights to FILE4, DIR-B is hidden from user X, as is FILE4. DIR-C is shown having been derived from information associated with FILE2, FILE3, and FILE5. Since user X has read rights to FILE2 and FILE3, DIR-C is visible to user X, while FILE5 is hidden from user X.

Figure 2A:
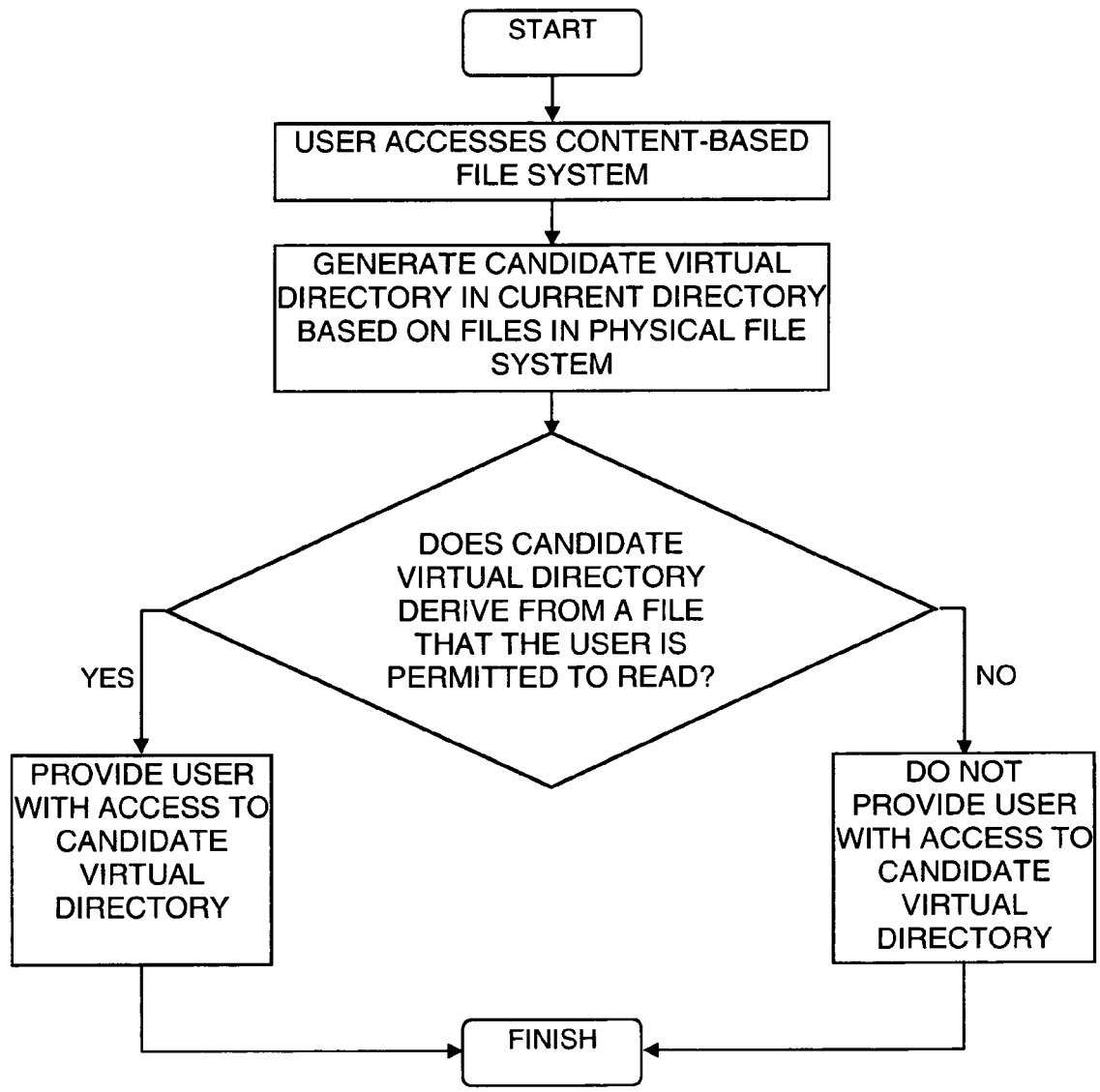
FIGS. 2A and 2B are simplified flowchart illustrations of an exemplary method of operation of the system of FIG. 1, operative in accordance with a preferred embodiment of the present invention.
Figure 2B:
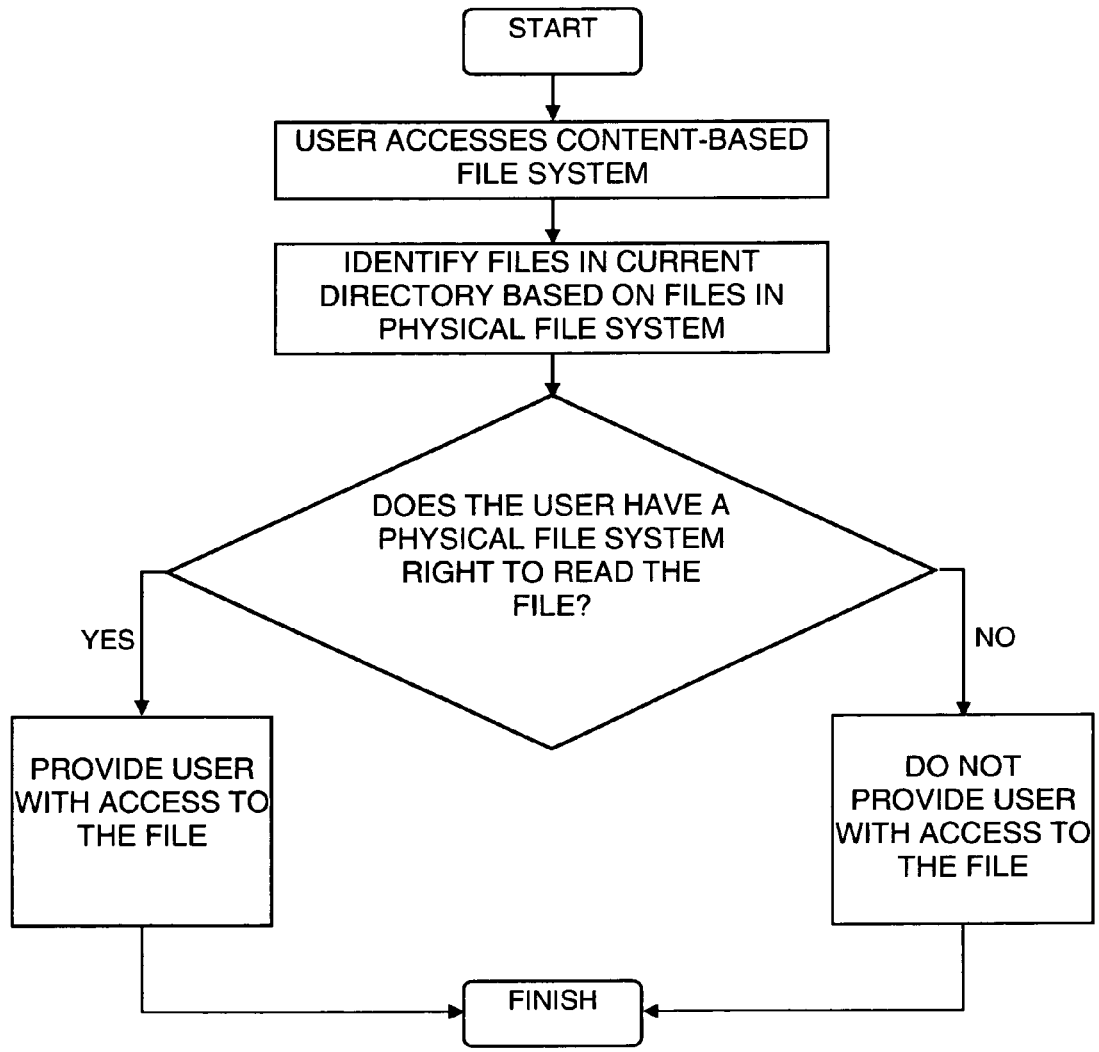

Reference is now made to FIGS. 2A and 2B, which are simplified flowchart illustrations of an exemplary method of operation of the system of FIG. 1, operative in accordance with a preferred embodiment of the present invention. In the method of FIGS. 2A and 2B a user is provided access to a content-based file system, such as to a virtual root directory that is unique to the user. One or more candidate virtual directories are then generated within the currently-accessed virtual directory based on files found in a physical file system. Each candidate virtual directory in the currently-accessed virtual directory is then evaluated to determine if the candidate virtual directory derives from a file in the physical file system for which the user has read rights. If so, the user may be granted access to the candidate virtual directory, such as by being shown the name of the candidate virtual directory, whereupon the user may traverse or otherwise interact with the candidate virtual directory. If not, access to the candidate virtual directory is withheld from the user. Each file identified in the currently-accessed virtual directory may also be evaluated to determine if the user has permission in the physical file system to read the file. If so, the user may be granted access to the file, such as by being shown the name of the file, whereupon the user may read or otherwise interact with the file.

Figure 3:
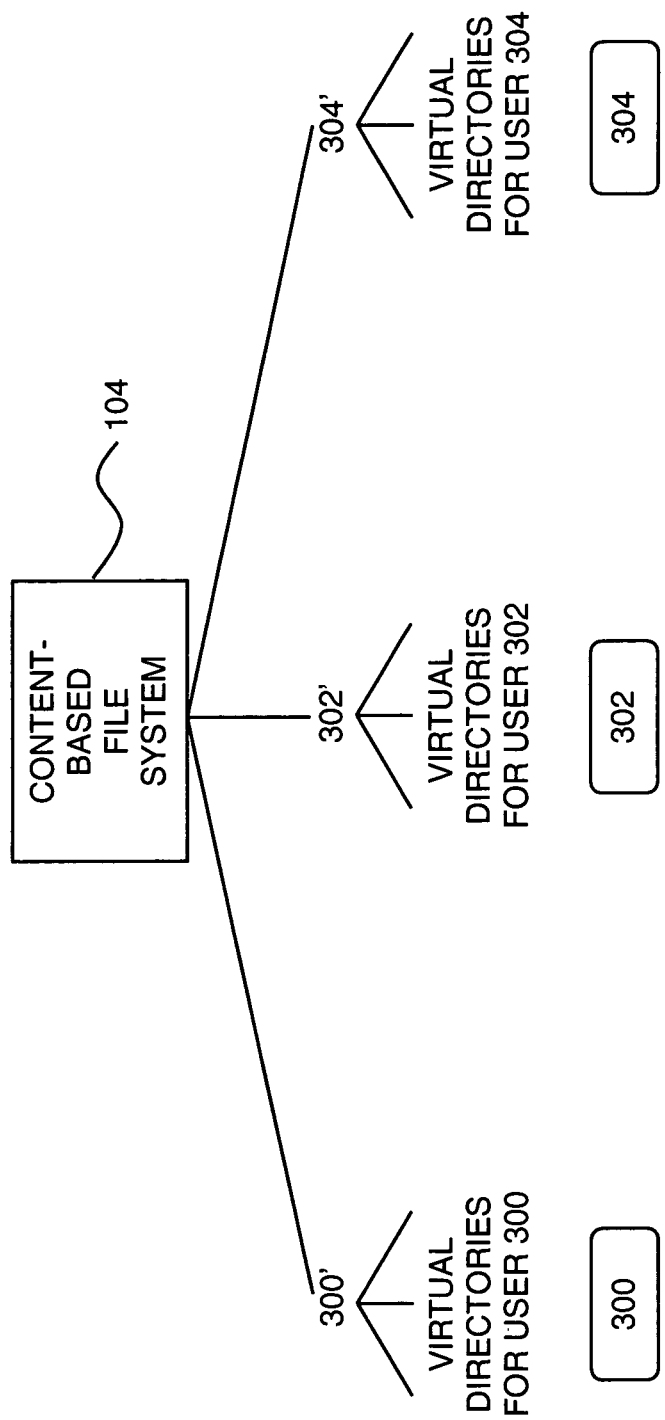
FIG. 3 is a simplified graphical illustration of an exemplary implementation of virtual directories, constructed and operative in accordance with a preferred embodiment of the present invention.

Reference is now made to FIG. 3, which is a simplified graphical illustration of an exemplary implementation of virtual directories, constructed and operative in accordance with a preferred embodiment of the present invention. In the FIG. 3 each user 300, 302, 304 is provided with a corresponding unique virtual root access directory 300', 302', 304' for navigating content-based virtual directory file system 104. Each access directory may be represented by the name of the user to which it belongs, and is preferably provided for the sole access of the user. Whenever the root of the content-based file system is read by a user, computer 102 preferably returns the unique access directory belonging to that user, under which appear any virtual directories that may be shown to the user.

In this manner file systems that cache directory content and service file system queries from cache in order to improve performance will avoid providing to one user the cached result set of another user which might otherwise be the case without the notion of results belonging to a specific user. It is appreciated that conventional techniques may be used to hide the existence of the access directory from the user or from a user application, skipping directly to a virtual directory under the user's access directory without revealing the existence of the access directory.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for enforcing computer-based file system security, the method comprising:
   receiving a request associated with a user to access a directory in a file system;
   determining if said directory includes at least one file for which said user has a read right; and
   providing said user with access to said directory only if at least one file is found in said directory for which said user has a read right.

2. A method according to claim 1 and further comprising generating said directory as a virtual directory in a content-based file system.

3. A method according to claim 2 wherein said generating step comprises deriving said virtual directory from said file in a physical file system.

4. A method according to claim 1 wherein said providing step comprises providing said access where said user has permission to read said file in a physical file system.

5. A method according to claim 1 wherein said providing step comprises providing said access where said directory or a descendant subdirectory thereof is derived from said file.

* * * * *